United States Patent Office 3,346,054
Patented Oct. 10, 1967

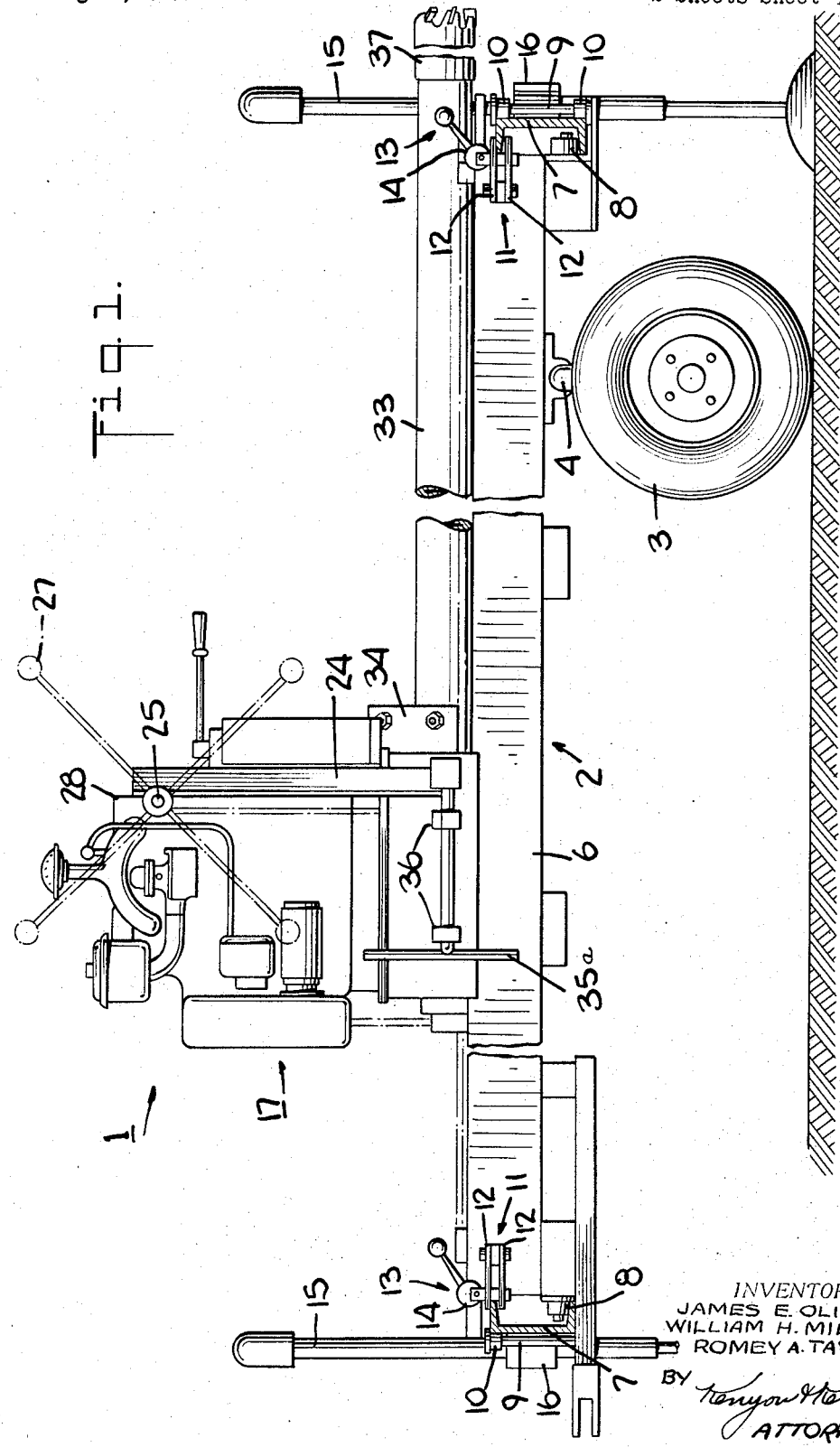

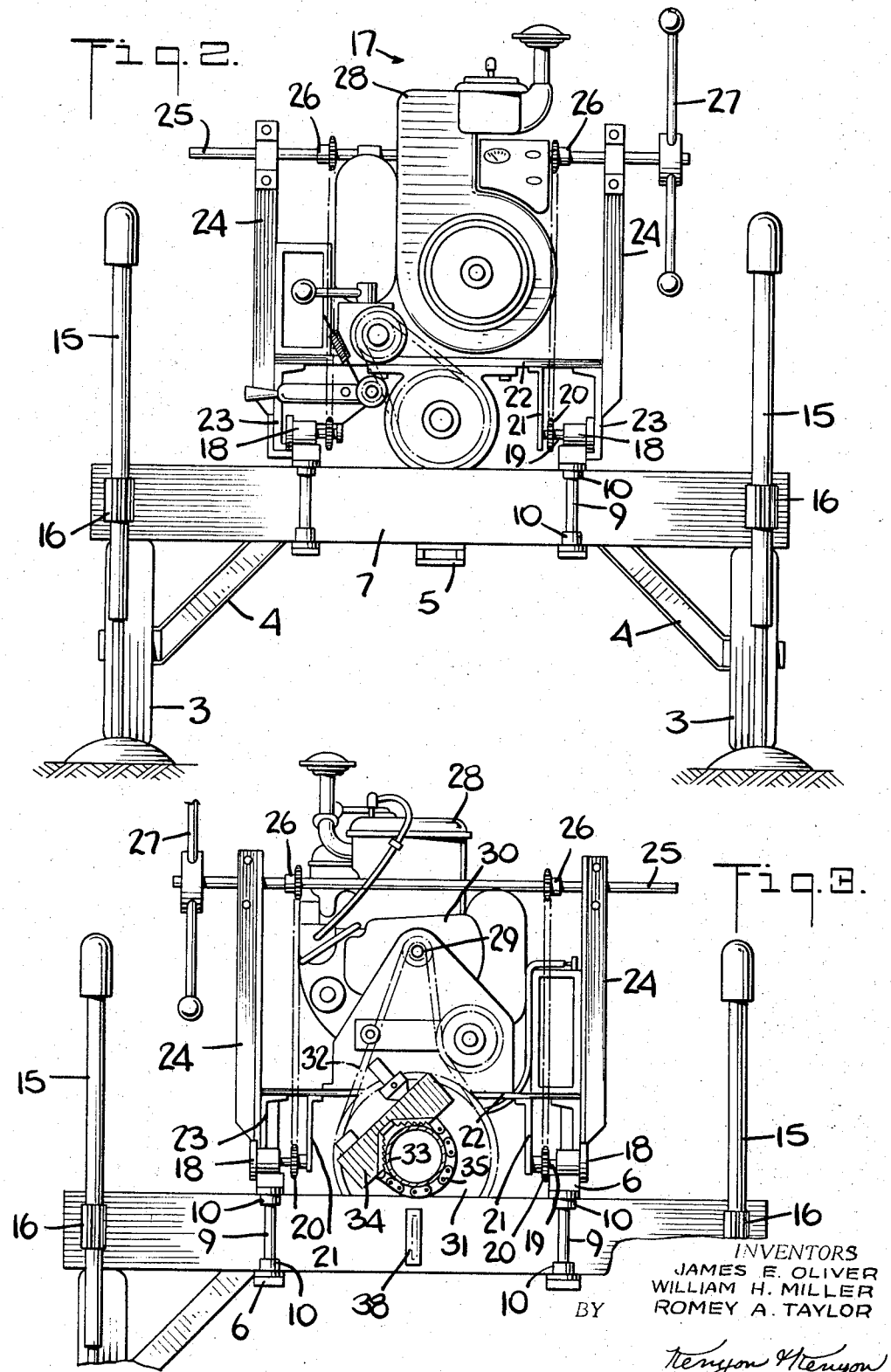

3,346,054
PRECISION CASING BORING MACHINE
James E. Oliver, William H. Miller, and Romey A. Taylor, Titusville, Fla., assignors to Mamba Engineering Company Inc., Titusville, Fla., a corporation of Florida
Filed Aug. 9, 1965, Ser. No. 478,308
7 Claims. (Cl. 173—23)

ABSTRACT OF THE DISCLOSURE

The boring machine is transportable and positions and drives a casing carried on the carriage in an accurate manner by adjusting the vertical and horizontal position of the carriage. The carriage is mounted to move horizontally in two perpendicular directions with respect to the cross member while the cross members are mounted on the jacks to move vertically.

This invention relates to horizontal boring machines. More particularly, this invention relates to a precision casing boring machine having a drill stem which is capable of precision movement in a horizontal plane and a vertical plane. Still more particularly, this invention relates to a precision casing boring machine which is capable of installing a plurality of casings in a precise arrangement.

In the past, a number of horizontal boring machines have been utilized to install casings; however, these machines have been found to disturb nearby shoulders, infields or aprons as well as to cause an inordinate amount of excavation. A more severe drawback of these boring machines is that when installing a plurality of casings, proper spacing and positioning of the casings has not been obtained.

This invention solves the problems of the prior art, especially those mentioned above, by providing a horizontal precision casing boring machine which is capable of installing groups of properly spaced casings with a precision of two inches in one hundred feet. The invention employs a cutter head which is slightly larger in diameter than the casing to be installed and utilizes the casing as a drill stem.

Generally, the invention comprises a machine which is transportable and which is mounted on hydraulic jacks when in place. The machine has a frame mounted on the hydraulic jacks which frame provides a support for a suitable carriage frame which carries an engine assembly. The engine assembly provides the power for the boring operations of the machine. The carriage frame provides a support for the casing to be installed. The casing is suitably driven by the engine assembly at one end thereof while the other end of the casing is coupled to a cutter head.

The frame is mounted on the hydraulic jacks in such a manner that it is laterally movable with respect to the jacks. Further the frame is capable of vertical movement by proper actuation of the hydraulic jacks. In order to advance the cutter head, the carriage frame is provided with a suitable chain feed which is connected to the engine assembly and which is operably connected to a manually operated handwheel assembly on the engine assembly.

When the proper position of the casing and cutter head assembly is established, boring operations are initiated. As the cutter head advances into the soil medium, the dislodged soil is transported through the casing by means of screw augers within the casing which rotate counter to the casing. In order to check the alignment and target precision of the machine during operation, a suitable level scope is positioned thereon to detect any drift.

Accordingly, it is an object of this invention to provide a horizontal boring machine which is capable of precision boring.

It is another object of this invention to provide a horizontal boring machine which is capable of installing a plurality of castings from one station.

It is another object of this invention to provide a horizontal boring machine which is capable of movement in a horizontal and a vertical plane.

It is another object of this invention to provide a horizontal boring machine which utilizes the casing to be installed as a drill stem.

It is another object of this invention to provide a horizontal precision boring machine which is capable of installing a group of casings one at a time in a precise arrangement.

These and other objects and advantages will become more apparent from the following detailed description and appended claims taken in conjunction with the drawings in which;

FIG. 1 illustrates a side view of the boring machine of this invention;

FIG. 2 illustrates a front end view of the machine shown in FIG. 1; and

FIG. 3 illustrates a rear end view of the machine shown in FIG. 1.

Referring to FIGS. 1, 2 and 3, the horizontal boring machine 1 is mounted on a transportable frame 2 which is suitably transported by means of a pair of wheels 3 mounted on respective axle frames 4. A yoke member 5 is fixed to the front end of the frame 2 and is adapted for connection to a suitable transporting vehicle for movement of the machine 1.

The frame 2 is constructed of a pair of horizontal frame members 6 and channel shaped end cross members 7. Each horizontal frame member 6 is provided with suitable rollers 8 on its respective ends which roll on the flanges of the respective cross members 7. Each horizontal frame member 6 is also provided with a guide means at each end which consists of a shaft 9 mounted in the ends of the frame member 6 and a pair of flanged nylon guide rollers 10 rotatably mounted on the shaft 9. The flanges of the guide rollers 10 overlie the flanges of the cross members 7 so that suitable guidance is maintained during lateral movement of the frame members 6.

A suitable locking means 11 is provided between the horizontal frame members 6 and cross members 7. The locking means 11 is mounted, for example, on each end of the frame members 6 and comprises a pair of cantilevered spaced fingers 12 suitably secured to the frame member 6, and a clamping means which passes through the spaced fingers 12 and has a suitable cam surface means 14 thereon for pressing the fingers 12 together. Accordingly, when the clamping means 13 is actuated, as by pivoting about its pivot axis, the cam surface means draws the fingers towards each other thereby engaging a flange of the respective cross members 7 so as to lock the frame member 6 to the cross member 7.

Each of the cross members 7 is provided with a pair of hydraulic jacks 15 which are mounted in suitable mounting brackets 16 thereon. The hydraulic jacks 15 permit the frame 2 to be vertically adjusted above the plane of transportation. When the frame 2 is in use, the wheels 3 are out of contact with the ground and the weight of the machine 1 is supported by the hydraulic jacks 15.

Referring to FIGS. 2 and 3, a carriage frame 17 is mounted on the horizontal frame members 6 by means of suitable flanged rollers 18. Each roller 18 is fixedly mounted on a shaft 19 which fixedly carries a sprocket gear 20 and which is rotatably mounted in a support 21 which depends from a platform 22 in the carriage frame 17. The platform 22 is provided with a pair of channel shaped side members 23, each of which mounts an upstanding leg member 24. The leg members 24 rotatably mount a rotatable shaft 25, having a pair of sprocket gears 26 between the members 24. The end of the shaft 25 is provided with a demountable hand wheel 27. A suitable pair of chains are each mounted on sprocket gears 20 and 26 so that upon rotation of shaft 25 by the hand wheel 27 the rollers 18 are rotatably moved along the respective frame members 6. This causes horizontal movement of the carriage frame 17 longitudinally of the machine 1.

The remainder of the carriage frame 17 is of conventional design and carries a suitable engine means 28, such as, a sixteen horsepower air cooled engine. The engine means 28 drives a suitable sprocket 29 through a gear ratio reduction and clutch assembly 30. The sprocket 29 drives a casing drive sprocket 31 through means of a suitable chain 32. The casing drive sprocket 31 is fixedly mounted on a spindle (not shown) which carries a casing 33 therein. A chuck 34 is provided in the carriage frame 17 and carries a roller chain 35 therein which encircles the casing 33. The chuck 34 is suitably tightened or loosened by a chuck wrench 35a which is mounted by brackets 36 on one of the side members 23.

The casing 33 mounts a cutter head 37 of slightly larger diameter on its leading end. The casing 33 is then utilized as a drill stem during a boring operation. The casing 33 carries a suitable screw auger (not shown) therewithin which is rotated counter to the casing 35 so as to evacuate the soil excavated by the cutter head 37.

Any quick leveling device can be utilized with the hydraulic jacks 15 to permit rapid adjustment in the vertical plane. Also, a level scope 38, such as, a four power level scope on an adjustable stem can be mounted on the cross member 7 to insure target precision and to allow compensation for drift.

In operation, the boring machine 1 is positioned at the boring station by lowering the hydraulic jacks 15 with respect to the frame 2 thereby raising the wheels 5 from the ground. The carriage frame 17 is then manually positioned at the front of the frame 2 and the casing 33 and suitable cutting head 37 are positioned in the chuck 34 and engine drive. The carriage frame 17 is then positioned vertically to the desired elevation by means of the jacks 15 and positioned horizontally to the desired position by means of the nylon guide rollers 10 and clamping means 13.

The engine is actuated when the cutter head 37 is in proper alignment. Upon actuation of the engine, the cutter head bores into the wall of soil and directs the excavated soil through the casing 33 to be evacuated by the screw augers.

After a casing has been properly set in place, the carriage frame 17 is moved to a new position which is horizontally and/or vertically spaced from the first bore position. The same operations are repeated with a second casing. Thus, by being able to precisely move the carriage frame either or both horizontally and vertically, a plurality of casings can be precisely set in place.

Having thus described an embodiment of the invention, it is contemplated that such is intended only for illustrative purposes and not by way of limitation as other modifications may be made within the scope of the invention.

What is claimed is:

1. A horizontal boring machine for installing a casing having an enlarged cutter head mounted thereon in a precise position comprising a frame having a pair of parallel spaced cross members and a pair of parallel frame members adjustably mounted on said cross members;

vertically adjustable means mounted in said cross members for vertically supporting said frame;

carriage means mounted on said frame members for mounting the casing for rotation on an axis parallel to the longitudinal axis of said frame;

means for moving said carriage means longitudinally of said frame members including a plurality of rotatable means secured to the base of said carriage means and mounted on said frame members, a rotatable shaft means mounted in said carriage means above said rotatable means, a first toothed sprocket gear mounted on each of said rotatable means, a plurality of second toothed sprocket gears mounted on said rotatable shaft means, a plurality of chains each operably connecting one of said first sprocket gears to one of said second sprocket gears to operably connect said shaft means to said plurality of rotatable means, and means mounted on said shaft for rotation of said shaft; and means for moving said frame members longitudinally of said cross members.

2. A horizontal boring machine as set forth in claim 1 wherein said means mounted on said shaft comprises a manually operated wheel.

3. A horizontal boring machine as set forth in claim 1 wherein said means for moving said frame members comprises, a first roller means mounted on each end of said frame members, each said first roller means rotatably engaging one of said cross members on the outside surface thereof, and a second roller means mounted on each end of said frame members, each said second roller means rotatably engaging one of said cross members on the inside surface thereof.

4. A horizontal boring machine as set forth in claim 3 which further comprises a clamping means on each end of said frame members for locking said frame members on said cross members.

5. A horizontal boring machine as set forth in claim 4 wherein said clamping means comprises a pair of fingers mounted in cantilever manner on said frame member and enveloping opposed surfaces of said cross member and a cam means mounted on said frame member for urging said fingers towards each other into pressure contact with said opposed surfaces of said cross member.

6. A horizontal boring machine as set forth in claim 1 wherein said vertically adjustable means comprises a plurality of hydraulic jacks.

7. A transportable support frame as set forth in claim 1 which further comprises a plurality of wheels mounted on said frame for transporting said frame, said vertically adjustable means being adapted to support said frame when said wheels are raised out of transporting position.

References Cited

UNITED STATES PATENTS

| | | | |
|---|---|---|---|
| 516,032 | 3/1894 | Symonds | 173—43 |
| 1,113,531 | 10/1914 | Ball | 173—43 |
| 1,699,936 | 1/1929 | Watchorn | 175—171 |
| 3,155,385 | 11/1964 | Lee | 269—236 |
| 3,291,534 | 12/1966 | Adams | 173—23 |
| 3,313,355 | 4/1967 | Pierce | 173—43 |
| 3,314,725 | 4/1967 | Tinlin | 173—43 |

FRED C. MATTERN, Jr., *Primary Examiner.*

L. P. KESSLER, *Assistant Examiner.*